(12) United States Patent
Ohara

(10) Patent No.: US 11,979,913 B2
(45) Date of Patent: May 7, 2024

(54) USER EQUIPMENT AND SIGNAL MONITORING METHOD

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 608 days.

(21) Appl. No.: 17/265,606

(22) PCT Filed: Aug. 9, 2018

(86) PCT No.: PCT/JP2018/030004
§ 371 (c)(1),
(2) Date: Feb. 3, 2021

(87) PCT Pub. No.: WO2020/031360
PCT Pub. Date: Feb. 13, 2020

(65) Prior Publication Data
US 2021/0307077 A1    Sep. 30, 2021

(51) Int. Cl.
| | |
|---|---|
| *H04W 74/08* | (2009.01) |
| *H04B 7/06* | (2006.01) |
| *H04L 5/00* | (2006.01) |
| *H04W 16/28* | (2009.01) |
| *H04W 74/0833* | (2024.01) |

(52) U.S. Cl.
CPC ...... *H04W 74/0833* (2013.01); *H04B 7/0617* (2013.01); *H04L 5/0048* (2013.01); *H04W 16/28* (2013.01)

(58) Field of Classification Search
CPC .............. H04W 74/0833; H04W 16/28; H04B 7/0617; H04L 5/0048
See application file for complete search history.

(56) References Cited

U.S. PATENT DOCUMENTS 11,291,007 B2 *   3/2022   Gao .................... H04W 72/046

OTHER PUBLICATIONS

International Search Report issued in Application No. PCT/JP2018/030004, dated Oct. 30, 2018 (3 pages).
Written Opinion issued in International Application No. PCT/JP2018/030004, dated Oct. 30, 2018 (4 pages).
3GPP TS 38.300 V15.2.0, Release 15; "3rd Generation Partnership Project; Technical Specification Group Radio Access Network; NR; NR and NG-RAN Overall Description; Stage 2;" Jun. 2018; Sophia Antipolis Valbonne, France (87 pages).
3GPP TSG RAN WG1 Meeting #93; R1-1805945; "Remaining details of RACH procedure;" ZTE; May 21-25, 2018; Busan, Korea (15 pages).

* cited by examiner

*Primary Examiner* — Justin Y Lee
(74) *Attorney, Agent, or Firm* — Osha Bergman Watanabe & Burton LLP

(57) ABSTRACT

There is provided a user equipment, the user equipment including: a reception unit that receives configuration information in which a reference signal and a synchronous signal block are associated with each other from a base station; a control unit that selects a specific reference signal from a plurality of reference signals to be monitored in a random access procedure; and a transmission unit that transmits a random access signal to the base station using a resource corresponding to the specific reference signal, wherein the reception unit assumes based on the configuration information that there is a quasi co-location relation between the synchronous signal block corresponding to the specific reference signal and a signal to be monitored in a predetermined search space, and monitors the signal.

5 Claims, 11 Drawing Sheets

FIG.6

| CSI-RS | associated SSB | isQuasiColocated |
|---|---|---|
| CSI-RS#1 | | |
| CSI-RS#2 | SSB#1 | true |
| CSI-RS#3 | | |
| CSI-RS#4 | SSB#2 | true |
| CSI-RS#5 | | |
| CSI-RS#6 | SSB#3 | false |
| CSI-RS#7 | | |
| CSI-RS#8 | SSB#4 | false |

USER EQUIPMENT AND SIGNAL MONITORING METHOD

TECHNICAL FIELD

The present invention relates to a user equipment in a radio communication system.

BACKGROUND ART

In 3GPP (3rd Generation Partnership Project), in order to realize further increase in system capacity, further increase in data transmission speed, further reduction in delay in a radio section, or the like, studies on a radio communication scheme referred to as New Radio (NR) or 5G are progressing (see, for example, Non-Patent Document 1). In the NR, various wireless technologies has been studied in order to satisfy the requirement to have delay of the radio section be 1 ms or less while achieving throughput of 10 Gbps or more.

In the NR, it is assumed that a wide frequency range from a low frequency band similar to LTE to an even higher frequency band than the LTE is used. Especially, since propagation loss increases in the high frequency band, in order to compensate for it, applying beam forming with a high beam gain has been studied. In the case of transmitting a signal by applying the beam forming, it can be considered that a base station or a user equipment determines a direction of a transmission beam by performing beam sweeping or the like so as to improve a reception quality on a communication partner side.

CITATION LIST

Non-Patent Document

Non-Patent Document 1: 3GPP TS 38.300 V15.2.0 (2018-06)

SUMMARY OF THE INVENTION

Problem to be Solved by the Invention

Even in the NR, it is assumed that a random access procedure similar to the random access procedure in the LTE is performed. However, in consideration of the beam forming as described above, there is a problem that the user equipment may not be able to properly monitor a signal transmitted from the base station.

The present invention has been created in view of the above-described problem, and it is an object of the present invention to provide a technique that enables a user equipment to properly monitor a signal in a radio communication system in which the beam forming is performed.

Means for Solving Problem

According to the disclosed technique, there is provided a user equipment, the user equipment including:

a reception unit that receives configuration information in which a reference signal and a synchronization signal block are associated with each other from a base station;

a control unit that selects a specific reference signal from a plurality of reference signals to be monitored in a random access procedure; and a transmission unit that transmits a random access signal to the base station using a resource corresponding to the specific reference signal, wherein the reception unit assumes based on the configuration information that there is a quasi co-location relation between the synchronization signal block corresponding to the specific reference signal and a signal to be monitored in a predetermined search space, and monitors the signal.

Effect of the Invention

According to the disclosed technique, in the radio communication system in which the beam forming is performed, a technique is provided that enables a user equipment to properly monitor the signal.

BRIEF DESCRIPTION OF THE DRAWINGS

FIG. 6 is a diagram illustrating an example of CSI-RS configuration information in Example 1.

MODE(S) FOR CARRYING OUT THE INVENTION

Hereinafter, an embodiment (present embodiment) of the present invention will be described with reference to the drawings. It is noted that the embodiment described below is just an example, and embodiments to which the present invention is applied are not limited to the following embodiments. For example, in the present embodiment, a CSI-RS is used as a reference signal used in a reference signal based random access procedure, but this is just an example, and a reference signal other than the CSI-RS may be used.

Although a radio communication system in the following embodiments basically is assumed to conform to NR, this is just an example, and part or all of the radio communication system according to the present embodiment may conform to a radio communication system (e.g., LTE) other than the NR.

(Overall System Configuration)

Figure 1:
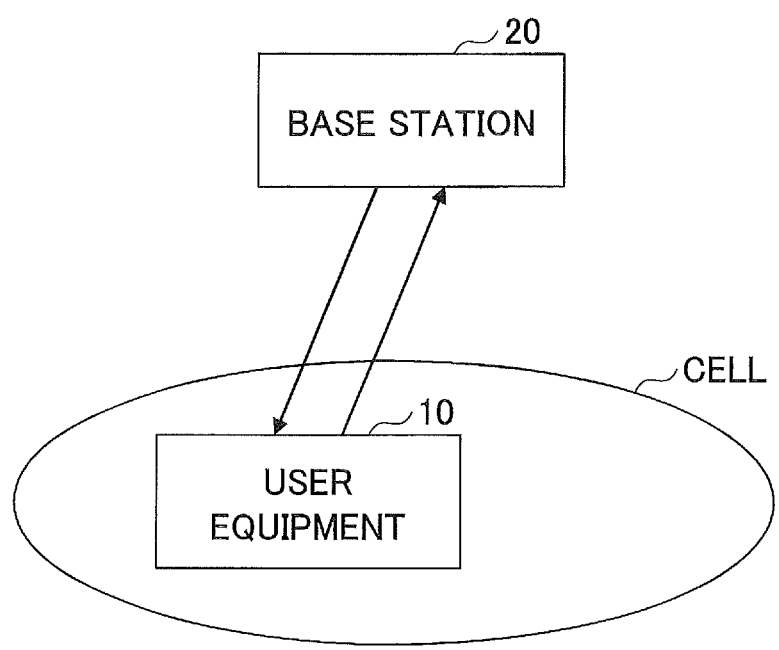
FIG. 1 is a configuration diagram of a communication system according to the present embodiment.

FIG. 1 illustrates a configuration diagram of a radio communication system according to the present embodiment. As shown in FIG. 1, the radio communication system according to the present embodiment includes a user equipment 10 and a base station 20. Although FIG. 1 illustrates one user equipment 10 and one base station 20, this is just an example, and those may be plural.

The user equipment 10 is a communication device including a radio communication function such as a smartphone, a mobile phone, a tablet, a wearable terminal, a communication module for M2M (Machine-to-Machine), or the like.

The user equipment 10 is wirelessly connected to the base station 20 and uses various communication services provided by the radio communication system. The base station 20 is a communication device that provides one or more cells and performs radio communication with the user equipment 10. Both the user equipment 10 and the base station 20 can perform beam forming to transmit and receive signals. Also, the user equipment 10 may be referred to as a UE, and the base station 20 may be referred to as a gNB.

In the present embodiment, a duplex scheme may be a Time Division Duplex (TDD) scheme or a Frequency Division Duplex (FDD) scheme.

In addition, in description of the present embodiment, transmitting a signal using a beam is performed, for example, by transmitting a signal multiplied by a precoding vector (a signal precoded with the precoding vector). In addition, transmitting the signal using the beam may be expressed as transmitting the signal with a specific antenna port. The antenna port refers to a logical antenna port defined by the 3GPP standard. Incidentally, the method of forming the beam is not limited to the above method. For example, in the user equipment 10 having a plurality of antenna elements and the base station 20 having a plurality of antenna elements, a method of changing angles of each of the antenna elements may be used, or a method combining the method using the precoding vector with the method changing the angles of the antenna elements may be used, or other method may be used.

Since the technique according to the present embodiment relates to a random access, beam forming, or the like in the NR, first of all, an example of these operations in the radio communication system will be described.

(Random Access Procedure Etc.)

Figure 2:
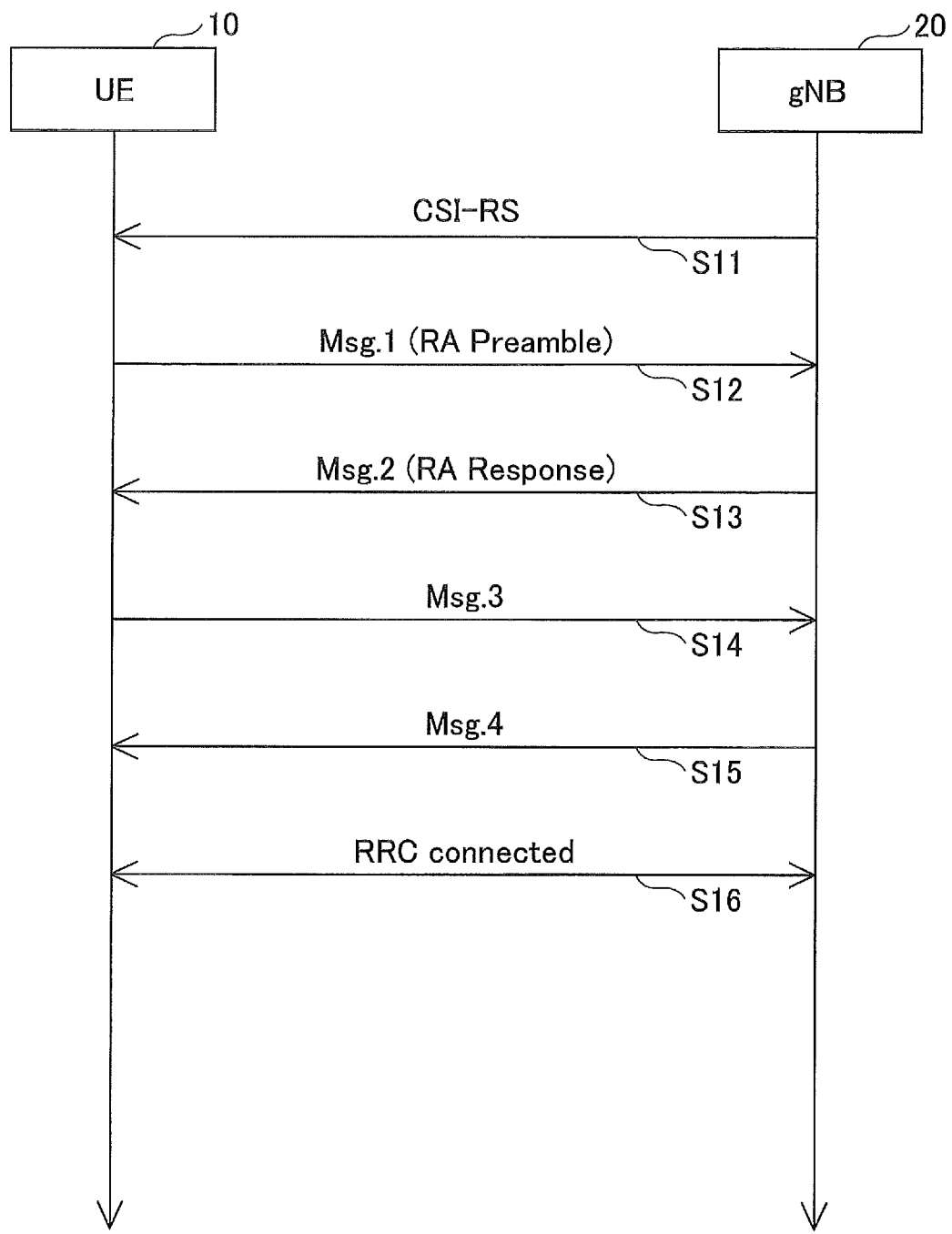
FIG. 2 is a diagram illustrating an example of a random access procedure.

With reference to FIG. 2, an example of a random access procedure according to the present embodiment will be described. In the NR, the random access procedure can be performed by selecting a SS/PBCH block (also referred to as a SSB, which may be referred to as a synchronization signal block), or the random access procedure can be performed by selecting a CSI-RS (Channel State Information-Reference Signal). Here, as an example, the random access procedure by selecting the CSI-RS is shown. For convenience, this random access procedure is called as a CSI-RS based random access. With regard to a process described here, the same process is performed even if the CSI-RS is replaced with the SSB.

In addition, here, a Contention based Random Access (CBRA) is shown as an example. In a Contention Free Random Access (CFRA), basically in the case where the UE has received Msg. 2, the random access procedure has been completed. It is noted that the technique according to the present invention is applicable to not only the CBRA but also the CFRA.

For example, the base station 20 transmits a CSI-RS for each beam, and the user equipment 10 monitors the CSI-RS for each beam (a plurality of CSI-RSs) (S11).

Subsequently, the user equipment 10 selects a CSI-RS whose reception power (CSI-RSRP) is greater than a predetermined threshold value from the plurality of CSI-RSs, and transmits Message 1 (Msg. 1 (=RA preamble)) using a PRACH resource (PRACH occasion) corresponding to the selected CSI-RS (S12).

Upon detecting the RA preamble, the base station 20 transmits Message 2 (Msg. 2 (=RA response)) which is a response to the RA preamble to the user equipment 10 (S13).

Upon receiving the RA response, the user equipment 10 transmits Message 3 (Msg. 3) including predetermined information to the base station 20 (S14). The Message 3 is, for example, an RRC connection request.

Upon receiving the Message 3, the base station 20 transmits Message 4 (Msg. 4, e.g., RRC connection setup) to the user equipment 10 (S15). Upon confirming that the predetermined information described above is included in Message 4, the user equipment 10 recognizes that the Message 4 is Message 4 addressed to itself, corresponding to the Message 3, completes the random access procedure, and establishes an RRC connection (S16).

Figure 3:
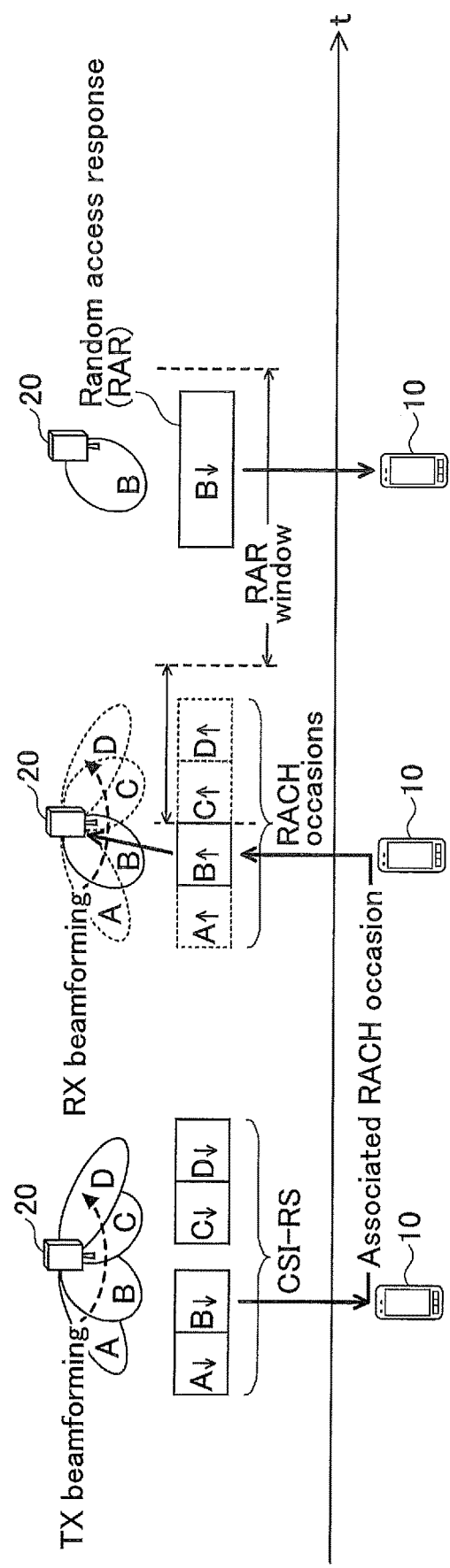
FIG. 3 is a diagram illustrating a relationship between a beam and a RACH.

FIG. 3 is a diagram illustrating an operation in which the user equipment 10 selects a beam in the random access procedure. In the example of FIG. 3, the base station 20 transmits a CSI-RS on each of four transmission beams indicated by A, B, C, and D. For example, a CSI-RS-A is transmitted on a beam A, a CSI-RS-B is transmitted on a beam B, a CSI-RS-C is transmitted on a beam C, and a CSI-RS-D is transmitted on a beam D.

For example, the user equipment 10 selects the CSI-RS-B whose reception power is larger than a threshold value, and transmits a RA preamble on a resource B associated with an index of the CSI-RS. It is noted that the resource for transmitting the RA preamble may be referred to as RACH occasion. Thereafter, for example, the base station 20 recognizes that a transmission beam B is selected as the transmission beam to the user equipment 10 by receiving the RA preamble on the resource B, and for example uses the transmission beam B to transmit an RA response. The relationship between the CSI-RS (beam) and the RACH occasion is indicated to the user equipment 10 in advance.

(PDCCH Order)

In the present embodiment, similar to the case of the LTE, for example, in the case where there is a possibility that UL synchronization for the user equipment 10 in a connected state is out of order, in order to establish the UL synchronization before DL transmission, a RACH is triggered to the user equipment 10 by PDCCH order from the base station 20.

At that time, for example, a preamble index (6 bits), a PRACH Mask Index (4 bits), a SSB index and the like are transmitted to the user equipment 10 using a DCI format. The information may be indicated by a RRC signaling.

The user equipment 10 can perform a contention free type RACH procedure by transmitting the preamble of a designated preamble index. Also, when a certain preamble index is designated, the user equipment 10 may perform a contention type RACH procedure. The PRACH mask index is information for indicating which time resource position among the RACH resources designated by an RACH configuration index (in a RACH configuration table) is to be used. In the NR, the above preamble index, the PRACH Mask Index, the DCI format, and the like may be indicated by different bit sizes or different formats.

(QCL)

In the NR, there is QCL (Quasi Co-Location) as a UE assumption for relationship considering beams. Having the QCL relation between antenna ports means that it can be assumed that large-scale properties of signals received by the user equipment 10 from one antenna port (or large-scale properties of a radio channel corresponding to the antenna port) are the same as all or part of large-scale properties of signals received from another port (or large-scale properties of a radio channel corresponding to the other antenna port). Here, the large-scale properties include Doppler spread related to a frequency offset, Doppler shift, average delay related to a timing offset, delay spread, and the like, and furthermore, the large-scale properties can also include an average gain.

For example, if an SSB antenna port (or a CSI-RS antenna port) has a QCL relation with (a DM-RS antenna port of) a PDCCH, the user equipment 10 assumes that they are transmitted on the same downlink beam and can receive the them.

As an example, in a type 1 PDCCH common search space which is an RA search space (a search space for random access), QCL assumption is determined as follows.

In the case of PDCCH order CFRA, when monitoring the RA search space for receiving an RA response or the like, the user equipment 10 assumes that there is a QCL relation between the PDCCH to be monitored and the SSB (or CSI-RS) which is assumed to have a QCL relation in receiving the PDCCH order.

In the cases other than the above, when monitoring the RA search space, the user equipment 10 assumes that there is a QCL relation between the PDCCH to be monitored and the SSB (or CSI-RS) which is selected by the user equipment 10 at the time of PRACH transmission.

It is noted that "there is a QCL relation between the PDCCH to be monitored and the SSB (or CSI-RS)" may be paraphrased as "there is a QCL relation between the signal to be monitored and the SSB (or CSI-RS)", "there is a QCL relation between the control signal to be monitored and the SSB (or CSI-RS)", or "there is a QCL relation between the control information to be monitored and the SSB (or CSI-RS)".

In NR assumed in the present embodiment, a transmission configuration indicator (TCI) state is introduced. The user equipment 10 can know the QCL relation between the antenna ports based on the set TCI state.

In addition, in the NR, one or more CORESETs are set from the base station 20 to the user equipment 10, and the correspondence between the CORESET and the search space is set from the base station 20 to the user equipment 10.

The CORESET is an abbreviation for control resource set, and indicates a box of resources to which the user equipment 10 should monitor the PDCCH (more specifically, the DCI transmitted on the PDCCH). For example, one CORESET is an area in which a frequency direction is composed of a plurality of resource blocks and a time direction is composed of 1, 2 or 3 OFDM symbols. For each search space, CORESET to be placed and a time position and cycle, etc. of the CORESET are specified. In addition, the TCI state is set in the CORESET. Setting the TCI state in the CORESET means that, for example, ID of the TCI state is included in configuration information of the CORESET.

Figure 4:
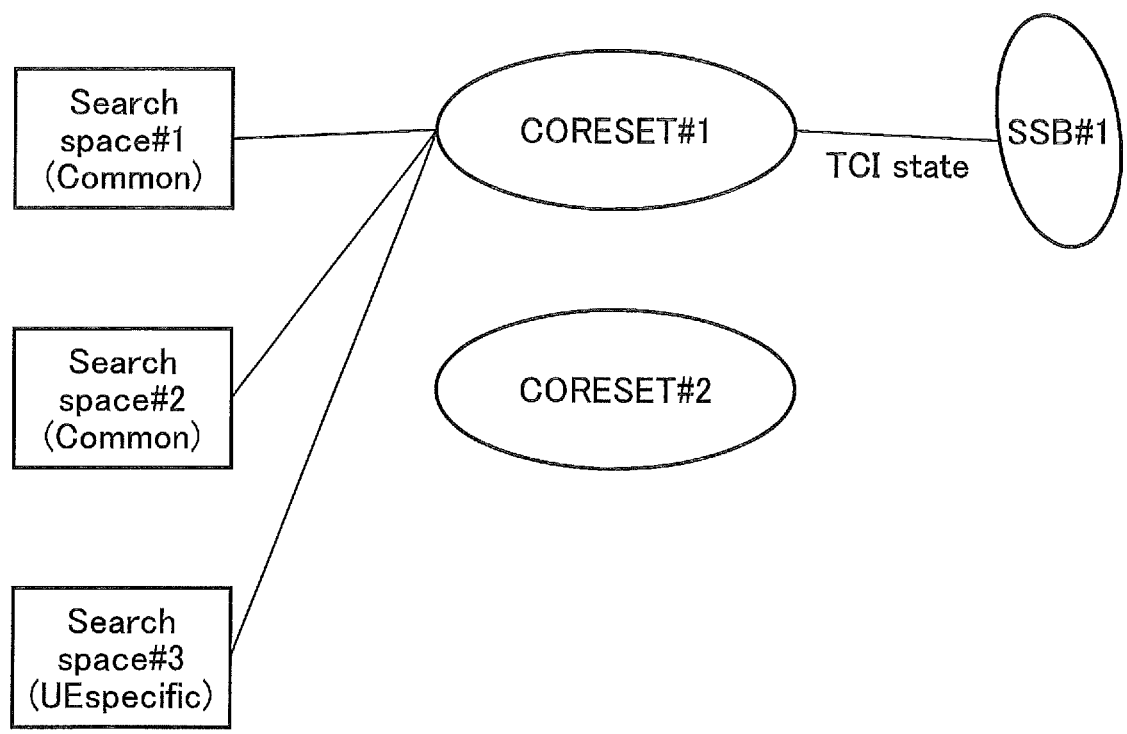
FIG. 4 is a diagram for explaining an example of CORE-SET.

For example, in the example of FIG. 4, search spaces #1 to #3 are associated with CORESET #1, the TCI state is set so that there is a QCL relation between (the PDCCH to be monitored in) the CORESET #1 and SSB #1. For example, the user equipment 10 that monitors a search space using the CORESET #1 can assume that a signal is transmitted by the PDCCH on a beam to which the SSB #1 is transmitted, and perform an operation for receiving the signal.

Assuming that a signal is transmitted by the PDCCH on a beam to which the SSB #1 is transmitted and performing an operation for receiving the signal means to, for example, perform an operation for demodulating the PDCCH with the DM-RS of the PDCCH associated with the SSB #1 by the QCL relation. Further assuming that a signal is transmitted by the PDCCH on a beam to which the SSB #1 is transmitted and performing an operation of receiving the signal may perform an operation of forming a reception beam corresponding to the beam to which the SSB #1 is transmitted and receiving a signal of the PDCCH.

It is also possible to configure multiple TCI states for a CORESET in the user equipment 10 by RRC signaling and dynamically select one TCI state from the multiple TCI states with the DCI or MAC CE from the base station 20.

With respect to the CORESET, there is a special CORESET #0 which is used to receive Remaining Minimum System Information (RMSI), paging, etc., for example. "CORESET #0" here is a CORESET associated with a type 0 PDCCH common search space (a search space for RMSI).

The CORESET #0 is associated with the SSB, and there are corresponding monitoring timings for each of all the SSBs transmitted from the NW. That is, unlike the case of another CORESET, the user equipment 10 that monitors the CORESET #0 assumes, according to a monitoring timing, a QCL relation with the SSB corresponding to the monitoring timing. Since the search space searched at the monitoring timing of the CORESET #0 may be referred to as a search space #0, the search space associated with the CORESET #0 may be read as a search space #0.

(Problem)

In the case where the user equipment 10 performs CSI-RS based random access (for example, when a handover or the like is performed), the user equipment 10 and the base station 20 may not share a common recognition about a proper SSB. Because of this, for example, the following problems may occur.

There is a search space in which timing of a resource to be monitored is associated with transmission timing of the SSB, such as the search space for RMSI (the search space associated with the CORESET #0) described above. That is, in this case, the timing of monitoring is changed by the SSB selected by the user equipment 10. Since this timing is associated with the SSB, but is not associated with the CSI-RS, it is impossible to have common recognition between the user equipment 10 and the base station 20 at what timing the search space should be monitored. This makes it impossible to have common recognition between the user equipment 10 and the base station 20 with respect to the number of times which PDCCH blind decoding can be performed, for example. In that case, for example, scheduling of the base station 20 is restricted, and it becomes difficult to perform proper scheduling.

More specifically, assuming a case where, for example, there are SSB #0 and SSB #1, the SSB #0 is transmitted in a slot #0 of an even numbered frame, and the SSB #1 is transmitted in a slot #1. In this case, assuming a case where resources to be monitored for searching the PDCCH are placed in the slot #0 of the even numbered frame and the slot #1.

At this time, for example, when the user equipment 10 can successfully receive the SSB #1, the user equipment 10 monitors a search space for the slot #1. However, since the base station 20 does not have the SSB information that the user equipment 10 can successfully receive, the base station 20 cannot recognize timing at which the user equipment 10 performs monitoring. Therefore, it is conceivable that the scheduling of the base station 20 is restricted and it becomes difficult to perform proper scheduling.

In addition, with respect to a search space having the QCL relation with the SSB (a search space other than the RA search space), since the base station 20 does not recognize the SSB that could be successfully received by the user equipment 10, in the search space, the base station 20 cannot transmit the PDCCH with QCL relation suitable for the user equipment 10. Therefore, there is a possibility that proper scheduling becomes difficult for the base station 20, and there is a possibility that decoding of the PDCCH becomes difficult for the user equipment 10.

Hereinafter, Examples 1 to 4 will be described as specific examples of operations for solving the above problems. Examples 1 to 4 can be implemented arbitrarily in combination as long as no contradiction arises.

Example 1

First, Example 1 will be described. In Example 1, the base station 20 configures a CSI-RS received (which may be paraphrased as "monitored") by the user equipment 10 and a SSB associated with the CSI-RS (referred to as "associated SSB") to the user equipment 10.

More specifically, the base station 20 transmits an index of the CSI-RS and an index of the associated SSB associated with the CSI-RS as CSI-RS configuration information for the user equipment 10 to the user equipment 10. Also, the configuration information may include information indicating that the CSI-RS to be configured and the associated SSB are in a QCL relation.

In addition, the associated SSB may be configured for each of all the CSI-RSs to be configured, or the associated SSB may be configured for only for one or a plurality of CSI-RSs of all the CSI-RSs to be configured.

In addition, a plurality of associated SSBs may be configured for one CSI-RS, or one associated SSB may be configured for a plurality of CSI-RSs.

With respect to configuration of the QCL relation between the CSI-RS and the associated SSB, the QCL relation may be indicated for all of "pairs of the CSI-RSs and the associated SSBs" or the QCL relation may be indicated for some of "pairs of the CSI-RSs and the associated SSBs", or the QCL relation may not be indicated at all.

In the case where the user equipment 10 performs the CSI-RS based random access procedure, the user equipment 10 may monitor only a CSI-RS associated with the associated SSB among all the CSI-RSs configured by the configuration information. Further, in the case where the user equipment 10 performs the CSI-RS based random access procedure, the user equipment 10 may monitor only CSI-RSs having the QCL relation with the associated SSB among all the CSI-RSs configured by the configuration information and among CSI-RSs associated with the associated SSB.

In addition, a CSI-RS for performing the CSI-RS based random access procedure may be configured by the configuration information from the base station 20 to the user equipment 10. The user equipment 10 may assume that all the CSI-RSs configured by the base station 20 to perform the CSI-RS based random access procedure are CSI-RSs associated with the associated SSB. The user equipment 10 may assume that all the CSI-RSs configured by the base station 20 to perform the CSI-RS based random access procedure are CSI-RSs to which the associated SSB is associated and the QCL relation is indicated to the associated SSB and the CSI-RS. Under such assumptions, the user equipment 10 may monitor all the CSI-RSs configured by the base station 20 to perform the CSI-RS based random access procedure when performing the CSI-RS based random access procedure.

As will be described later, the user equipment 10 assumes the QCL relation between the CSI-RS selected in the random access procedure and the associated SSB and monitors a search space other than the RA search space.

Figure 5:
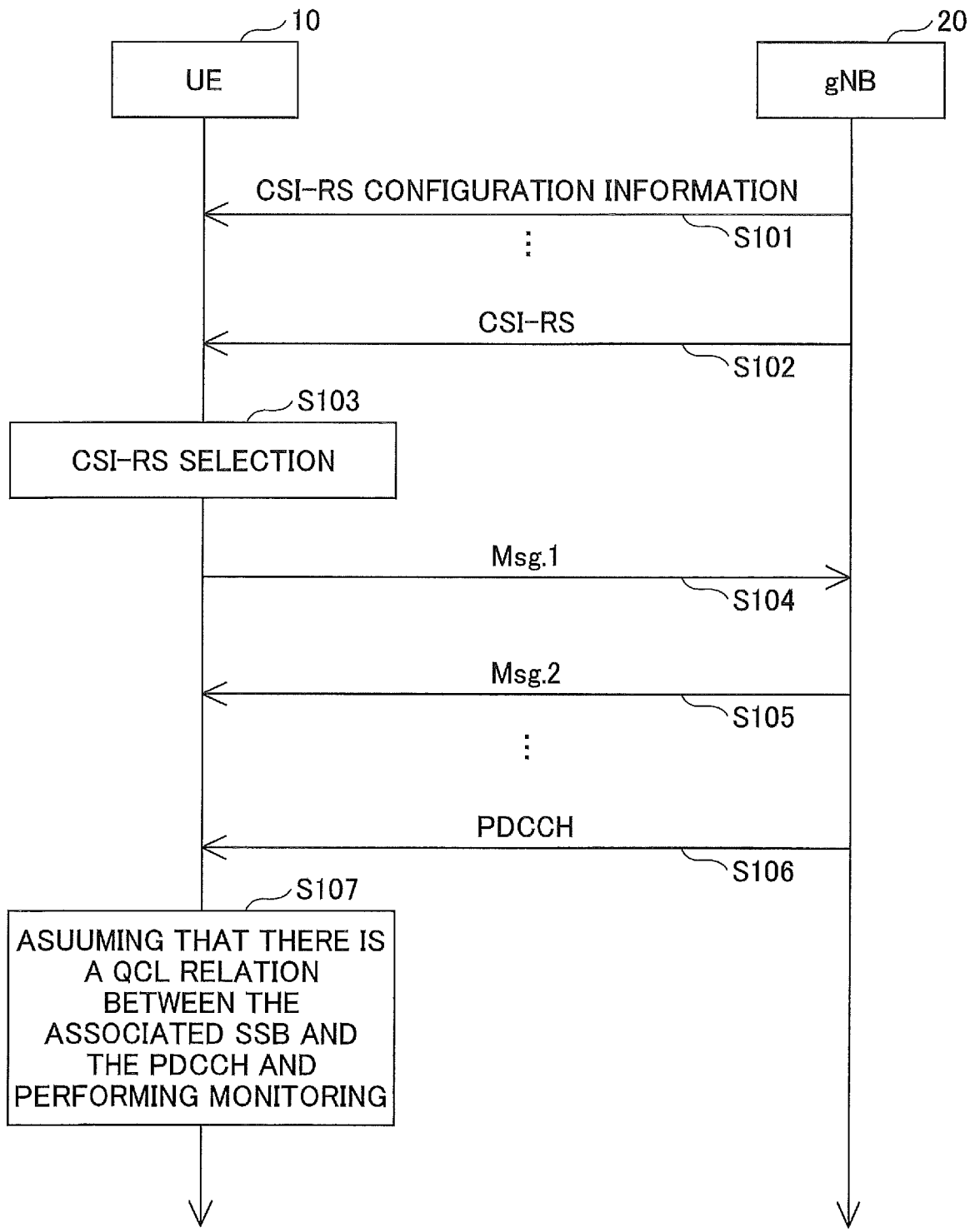
FIG. 5 is a diagram for explaining Example 1.

An operation example of Example 1 will be described with reference to the sequence diagram of FIG. 5. The sequence diagram of FIG. 5 illustrates an example of performing the CSI-RS based random access procedure.

In S101, the base station 20 transmits CSI-RS configuration information, and the user equipment 10 receives the CSI-RS configuration information. The CSI-RS configuration information may be transmitted as an RRC information element, a MAC layer signal, or a DCI.

An example of information indicated by the CSI-RS configuration information is shown in FIG. 6. Although FIG. 6 is shown in the form of a table for the sake of convenience, the CSI-RS configuration information does not actually need to be transmitted in the form of the table.

In the configuration information shown in the example of FIG. 6, CSI-RSs #1 to #8 are configured, and the associated SSBs are respectively configured to the CSI-RSs whose indices are even. In addition, it is indicated that "CSI-RS #2 and SSB #1" and "CSI-RS #4 and SSB #2" are respectively in the QCL relation.

It is noted that the CSI-RS index may be referred to as a CSI-RS resource index. CSI-RS resource information is configured for each CSI-RS index from the base station 20 to the user equipment 10, and the user equipment 10 can monitors, according to a CSI-RS index, a resource corresponds to the CSI-RS index, and receive the CSI-RS.

Returning to FIG. 5, the description will be continued. The user equipment 10 monitors one or a plurality of CSI-RSs transmitted from the base station 20 according to the CSI-RS configuration information.

In S103, the user equipment 10 selects a CSI-RS whose reception power (CSI-RSRP) is larger than a predetermined threshold from one or a plurality of CSI-RSs to be monitored.

In S104, the user equipment 10 transmits a RA preamble using a PRACH resource (PRACH occasion) corresponding to the selected CSI-RS. In S105, the base station 20 transmits an RA response. The user equipment 10 assumes that there is a QCL relation between the CSI-RS selected in S103 and a PDCCH, searches a RA search space for receiving the RA response and receives the PDCCH, thus the user equipment 10 receives the RA response.

From the base station 20, a signal is transmitted on the PDCCH with a resource of a search space other than the RA search space (S106). The search space other than the RA search space may be, for example, a search space for RMSI, a search space for paging, a common search space other than these search spaces, or a UE specific search space.

In S107, when monitoring a search space other than the RA search space, the user equipment 10 assumes that there is a QCL relation between a signal on the PDCCH transmitted with a resource of the search space and the associated SSB for the CSI-RS selected in S103, and performs monitoring. In this case, the base station 20 performs signal transmission of the PDCCH so that there is the QCL relation between the signal on the PDCCH transmitted with the resource of the search space and the associated SSB for the CSI-RS selected in S103.

When the PDCCH can be decoded, the user equipment 10 receives information (e.g., basing information) on a PDSCH.

With respect to the monitoring of the search space other than the RA search space in the above S107, the user equipment 10 may switch the ICI state already configured for the CORESET associated with the search space to the SSB specified as the associated SSB for the CSI-RS selected in S103, so may assume that there is a QCL relation between the PDCCH and the associated SSB for the CSI-RS selected in S103 and perform monitoring.

When the user equipment 10 is indicated that there is a QCL relation between the CSI-RS and the associated SSB, the user equipment 10 may perform the above-described operation (an operation that assumes that there is the QCL relation between the search space and the associated SSB), or may perform the above-described operation (the operation that assumes that there is the QCL relation between the search space and the associated SSB), regardless of whether or not it is indicated that there is the QCL relation between the CSI-RS and the associated SSB.

According to Example 1, in the case of performing the CSI-RS based random access procedure, the user equipment 10 can perform monitoring the search space other than the RA search space by assuming a proper QCL relation.

Whether or not the operation of Example 1 is applied may be determined depending on whether or not the search space other than the RA search space is associated with the CORESET #0. For example, when the search space other than the RA search space is associated with the CORESET #0, the operation of Example 1 is applied, and when any "search space other than the RA search space" is not associated with the CORESET #0, the operation of Example 1 may not be applied. Likewise for each of Examples 2 to 4, whether or not the operations of Examples 2 to 4 are applied may be determined depending on whether or not the search space other than the RA search space is associated with the CORESET #0.

Example 2

Figure 7:
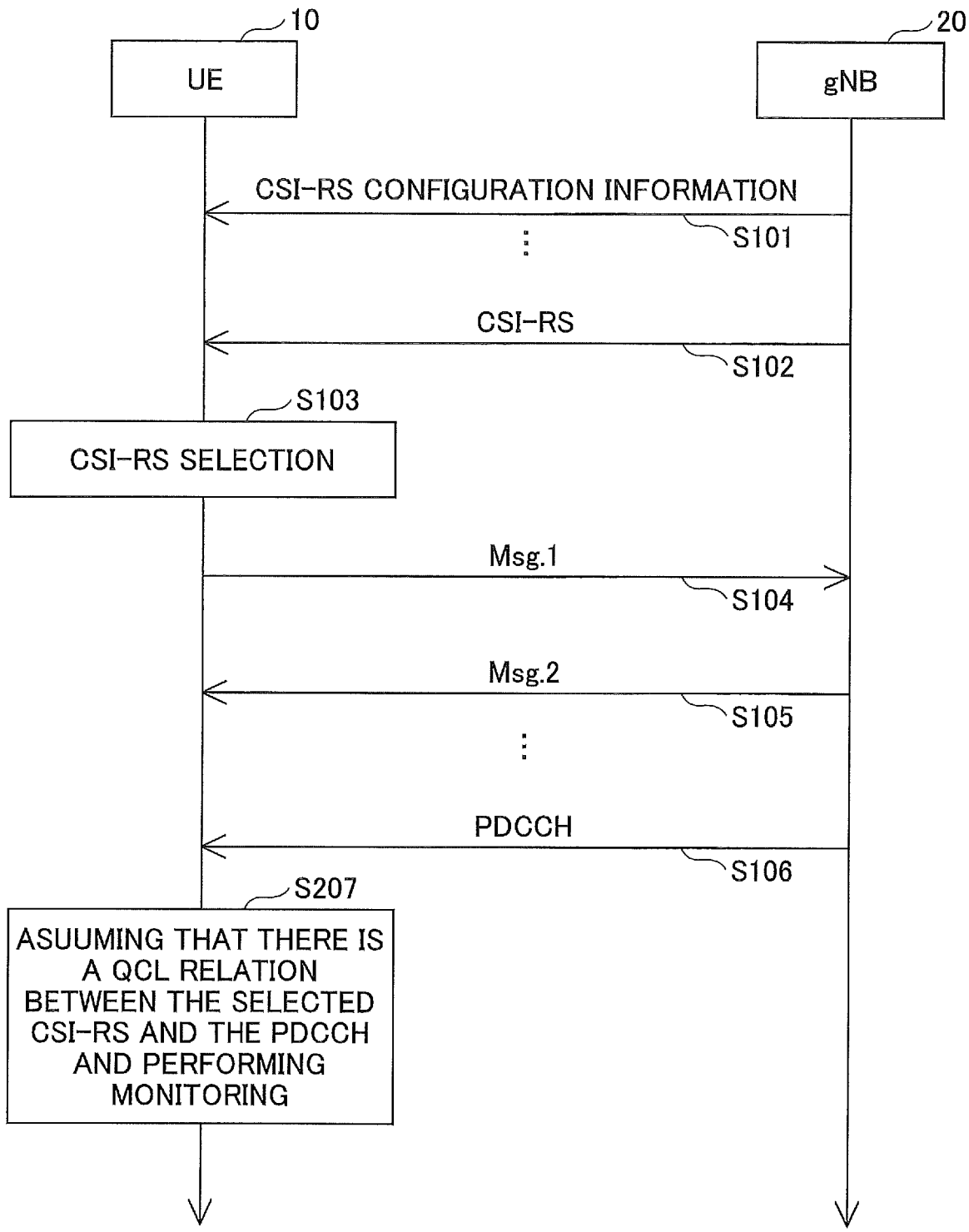
FIG. 7 is a diagram for explaining Example 2.

Next, Example 2 will be described. As with Example 1, Example 2 is also an example of performing CSI-RS based random access. An operation example of Example 2 will be described with reference to the sequence diagram of FIG. 7. Hereinafter, a description will be given focusing on parts different from Example 1.

S101 to S106 are the same as S101 to S106 in Example 1. In Example 2, in S207, when monitoring the search space other than the RA search space, the user equipment 10 assumes that there is a QCL relation between a signal on the PDCCH transmitted with the resource of the search space and the CSI-RS selected in S103, and performs monitoring. In this case, the base station 20 performs signal transmission of the PDCCH so that there is the QCL relation between the signal on the PDCCH transmitted with the resource of the search space and the CSI-RS selected in S103.

When the PDCCH can be decoded, the user equipment 10 receives information (e.g., paging information) on a PDSCH.

With respect to the monitoring of the search space other than the RA search space in the above S207, the user equipment 10 may switch the TCI state already configured for the CORESET associated with the search space to the CSI-RS selected in S103, so may assume that there is a QCL relation between the PDCCH and the CSI-RS selected in S103 and perform monitoring.

In Example 2, it is noted that the associated SSB may not be configured in the CSI-RS configuration information.

According to Example 2, when performing the CSI-RS based random access procedure, the user equipment 10 can monitor the search space other than the RA search space by assuming a proper QCL relation.

Example 3

Figure 8:
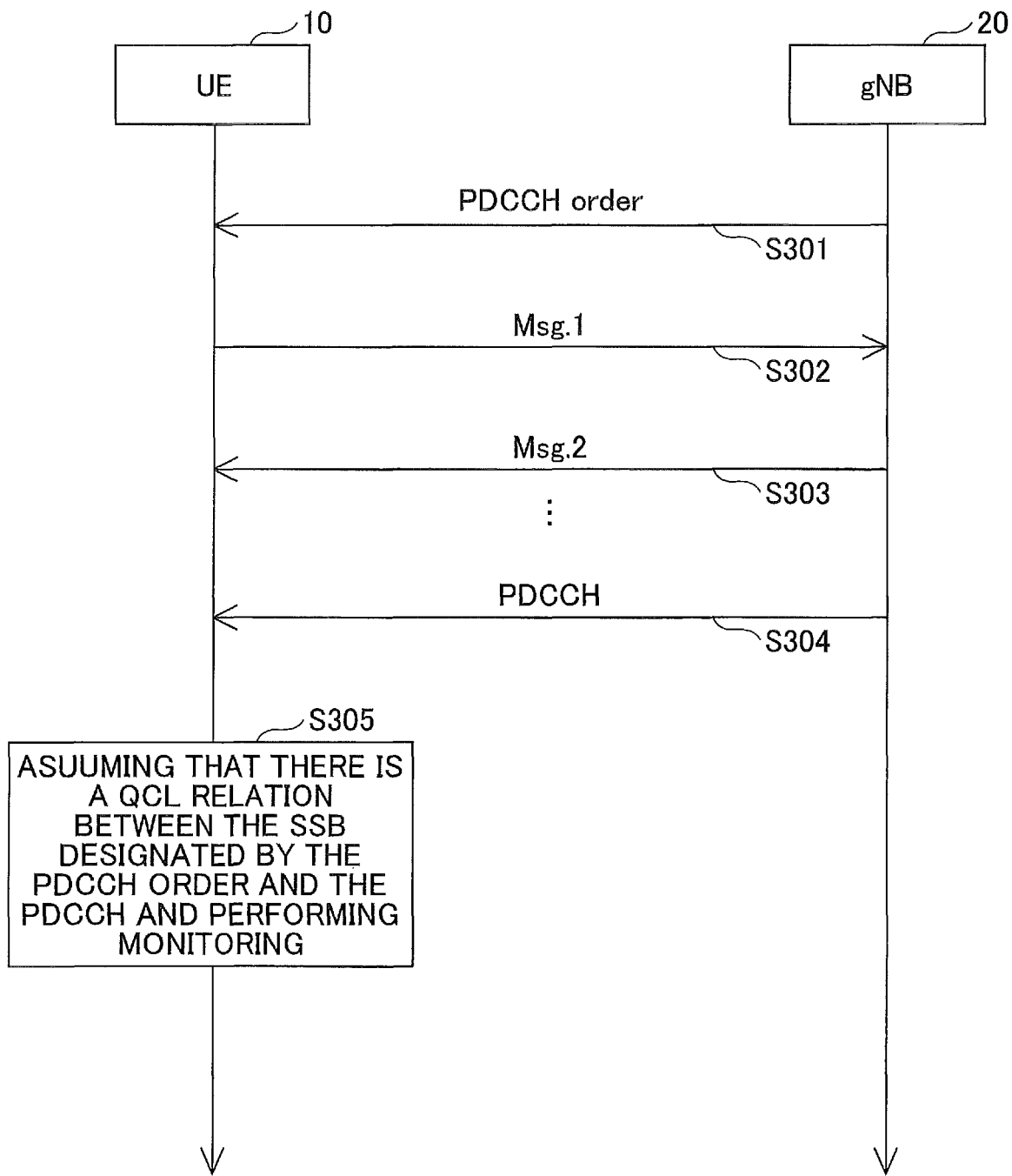
FIG. 8 is a diagram for explaining Example 3.

Next, Example 3 will be described. Example 3 illustrates an example of a random access procedure by a PDCCH order. Example 3 will be described with reference to FIG. 8.

In S301, the user equipment 10 receives the PDCCH order from the base station 20.

The user equipment 10 transmits a RA preamble using a PRACH resource (PRACH occasion) designated by a PRACH mask index included in the PDCCH order (S302). It is noted that this PRACH occasion is associated with a SSB index included in the PDCCH order. In S303, the user equipment 10 receives an RA response.

From the base station 20, a signal is transmitted on the PDCCH with a resource of a search space other than a RA search space (S304).

In S305, when monitoring the search space other than the RA search space, the user equipment 10 assumes that there is a QCL relation between a signal on the PDCCH transmitted with a resource of the search space and the SSB of the SSB index designated by the PDCCH order received in S301, and performs monitoring. In this case, the base station 20 performs signal transmission of the PDCCH so that there is the QCL relation between the signal on the PDCCH transmitted with the resource of the search space and the SSB of the SSB index designated by the PDCCH order transmitted in S301.

When the PDCCH can be decoded, the user equipment 10 receives information (e.g., paging information) on a PDSCH.

With respect to the monitoring of the search space other than the RA search space in the above S305, the user equipment 10 may switch the TCI state already configured for the CORESET associated with the search space to the SSB of the SSB index designated by the PDCCH order received in S301, so may assumes that there is a QCL relation between the SSB and the PDCCH and perform monitoring.

According to Example 3, in the case of performing the random access procedure by a trigger of the PDCCH order, the user equipment 10 can monitor the search space other than the RA search space by assuming a proper QCL relation.

Example 4

Figure 9:
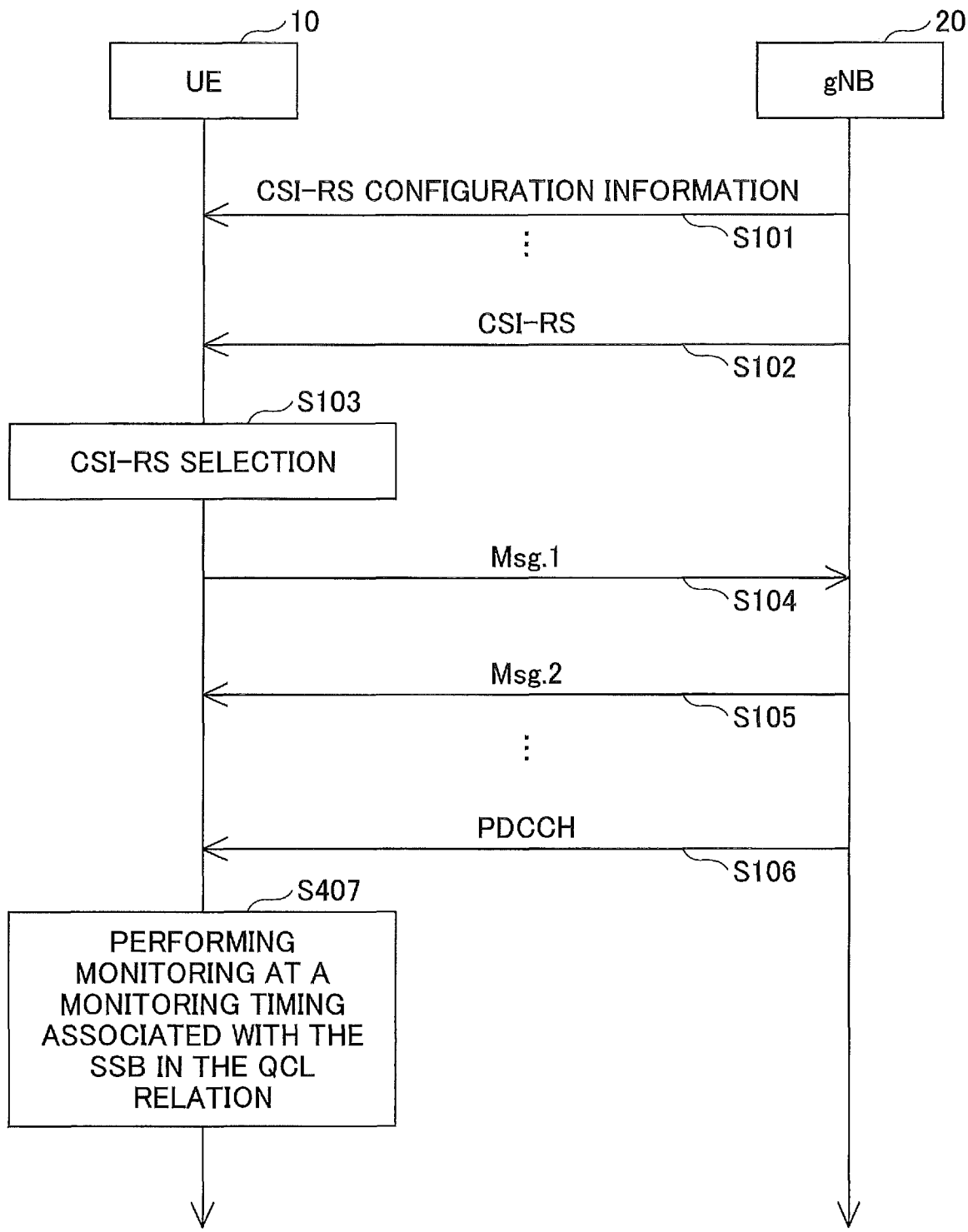
FIG. 9 is a diagram for explaining Example 4.

Next, Example 4 will be described. As with Example 1, Example 4 is also an example of performing CSI-RS based random access. An operation example of Example 4 will be described with reference to the sequence diagram of FIG. 9. Hereinafter, a description will be given focusing on parts different from Example 1.

S101 to S106 are the same as S101 to S106 in Example 1. In Example 4, in step S407, the user equipment 10 monitors a search space in which timing of a resource to be monitored is associated with transmission timing of the SSB as the search space other than the RA search space. As described above, this search space is, for example, a search space for RMSI (type 0 PDCCH common search space).

Upon monitoring the search space, the user equipment 10 assumes that there is a QCL relation between the PDCCH and the SSB specified as the associated SSB for the CSI-RS selected in S103, and switches the monitoring timing to a monitoring timing associated with the SSB and performs monitoring. In this case, the base station 20 performs signal transmission of the PDCCH so that there is a QCL relation between a signal on the PDCCH transmitted with a resource of the timing associated with the SSB and the associated SSB for the CSI-RS selected in S103.

More specifically, assuming a case where, for example, there are SSB #0 and SSB #1, the SSB #0 is transmitted in a slot #0 of an even numbered frame and the SSB #1 is transmitted in slot a #1. In this case, assume a case where resources to be monitored for searching the PDCCH are placed in the slot #0 of the even numbered frame and the slot #1.

In this case, if the associated SSB for the CSI-RS selected in S103 is the SSB #1, in S407, the user equipment 10 assumes the QCL relation between the PDCCH and the SSB #1 and then monitors the resource of timing associated with the SSB #1.

When the PDCCH can be decoded, the user equipment 10 receives information (for example, RMSI) on a PDSCH.

When the user equipment 10 is indicated that there is a QCL relation between the CSI-RS and the associated SSB, the user equipment 10 may perform the above-described operation, or may perform the above-described operation, regardless of whether or not it is indicated that there is the QCL relation between the CSI-RS and the associated SSB.

According to Example 4, in the case of performing the CSI-RS based random access procedure, the user equipment 10 can perform monitoring the search spaces other than the RA search space at a proper timing by assuming a proper QCL relation.

(Device Configuration)

Next, a functional configuration example of the user equipment 10 and the base station 20 that perform the above-described processing operations will be described. The user equipment 10 and the base station 20 have all the functions described in the present embodiment. However, the user equipment 10 and the base station 20 may have only some functions of all the functions described in the present embodiment. For example, the user equipment 10 and the base station 20 may have only functions of some embodiments of Examples 1 to 4. It is noted that the user equipment 10 and the base station 20 may be collectively referred to as a communication device.

<User Equipment>

Figure 10:
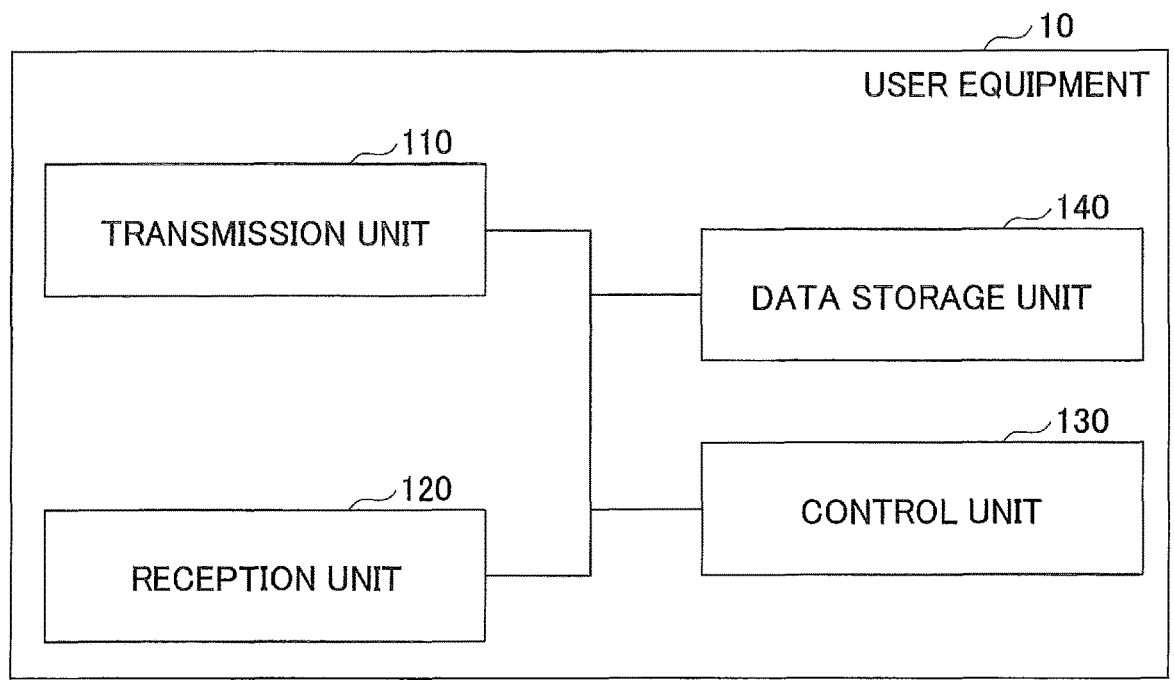
FIG. 10 is a diagram illustrating an example of a functional configuration of a user equipment 10.

FIG. 10 is a diagram illustrating a functional configuration example of the user equipment 10. As shown in FIG. 10, the user equipment 10 includes a transmission unit 110, a reception unit 120, a control unit 130, and a data storage unit 140. The functional configuration shown in FIG. 10 is just an example. The function classifications and the names of the functional units are not particularly limited as long as the operations according to the present embodiment can be carried out. It is noted that the transmission unit 110 may be referred to as a transmitter and the reception unit 120 may be referred to as a receiver.

The transmission unit 110 generates a transmission signal from a transmission data and wirelessly transmits the transmission signal. In addition, the transmission unit 110 can form one or more beams. The reception unit 120 wirelessly receives various signals, and obtains a signal of a higher layer from the signal of the received physical layer. In addition, the reception unit 120 includes a measuring unit that measures a signal to be received and obtains reception power thereof and the like.

The control unit 130 performs control of the user equipment 10. It is noted that a function of the control unit 130 related to transmission may be included in the transmission unit 110 and a function of the control unit 130 related to reception may be included in the reception unit 120. Further, the measuring unit described above may be included in the control unit 130. For example, the CSI-RS configuration information described in Example 1 is stored in the data storage unit 140. The CSI-RS configuration information is read out from the data storage unit 140 and is used for signal monitoring or the like by the reception unit 120. It is noted that configuration information related to transmission may be stored in the transmission unit 110 and configuration information related to reception may be stored in the reception unit 120.

For example, the reception unit 120 may be configured to receive configuration information in which a reference signal and a synchronization signal block are associated with each other from the base station. In a random access procedure, the control unit 130 may be configured to select a specific reference signal from a plurality of reference signals to be monitored. The transmission unit 110 may be configured to transmit a random access signal to the base station using a resource corresponding to the specific reference signal. Furthermore, the reception unit 120 may be configured to assume based on the configuration information that there is a quasi co-location relation between the synchronization signal block corresponding to the specific reference signal and a signal to be monitored in a predetermined search space, and to monitor the signal.

The configuration information includes information of a reference signal associated with a synchronization signal block and information of a reference signal not associated with a synchronization signal block. In the random access procedure, the reception unit 120 may monitor the reference signal associated with the synchronization signal block.

In the case where the signal to be monitored is a signal transmitted with a resource at a timing associated with a synchronization signal block, the reception unit 120 may monitor the signal at the timing associated with the synchronization signal block corresponding to the specific reference signal.

In addition, the control unit 130 may configured to select a specific reference signal from a plurality of reference signals to be monitored in a random access procedure. The transmission unit 110 may be configured to transmit a random access signal to the base station using a resource corresponding to the specific reference signal. The reception unit 120 may be configured to assume that there is a quasi co-location relation between the specific reference signal and a signal to be monitored in a predetermined search space, and to monitor the signal.

Further, the reception unit 120 may be configured to receive control information which is a trigger for starting a random access procedure from a base station. The transmission unit 110 may be configured to transmit a random access signal to the base station based on the trigger. Further, the reception unit 120 may be configured to assume that there is a quasi co-location relation between a specific reference signal or a specific synchronization signal block designated by the control information and a signal to be monitored in a predetermined search space, and to monitor the signal.

<Base Station 20>

Figure 11:
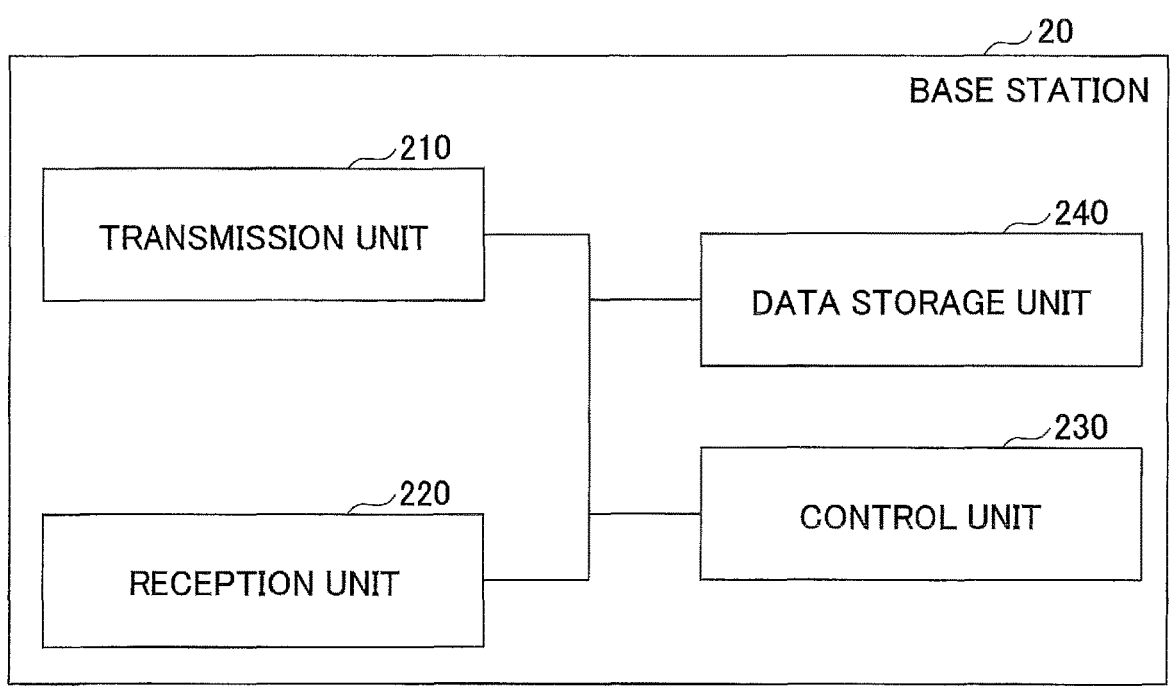
FIG. 11 is a diagram illustrating an example of a functional configuration of a base station 20.

FIG. 11 is a diagram illustrating a functional configuration example of the base station 20. As shown in FIG. 11, the base station 20 includes a transmission unit 210, a reception unit 220, a control unit 230, and a data storage unit 240. The functional configuration shown in FIG. 11 is just an example. The function classifications and the names of the functional units are not particularly limited as long as the operations according to the present embodiment can be carried out. It is noted that the transmission unit 210 may be referred to as a transmitter and the reception unit 220 may be referred to as a receiver.

The transmission unit 210 includes a function of generating a signal to be transmitted to the user equipment 10 side and transmitting the signal wirelessly. In addition, the transmission unit 210 forms one or more beams. The reception unit 220 includes a function of receiving various signals transmitted from the user equipment 10 and obtaining information of a higher layer, for example, from the received signals. In addition, the reception unit 220 includes a measuring unit that measures a signal to be received and obtains reception power thereof and the like.

The control unit 230 performs control of the base station 20. It is noted that a function of the control unit 230 related to transmission may be included in the transmission unit 210 and a function of the control unit 230 related to reception may be included in the reception unit 220. For example, the CSI-RS configuration information described in Example 1 is stored in the data storage unit 240. The CSI-RS configuration information is read from the data storage unit 240 and is transmitted by the transmission unit 210. It is noted that configuration information related to transmission may be stored in the transmission unit 210 and configuration information related to reception may be stored in the reception unit 220.

<Hardware Configuration>

The block diagrams used in the description of the above embodiments (FIGS. 10 and 11) illustrate blocks in the units of functions. These functional blocks (constituent units) are embodied in a combination of hardware and/or software. In addition, means for embodying the functional blocks is not particularly limited. That is, each functional block may be embodied by one unit in which a plurality of elements are physically and/or logically coupled, or may be embodied by two or more units which are physically and/or logically separated and which are connected directly and/or indirectly (for example, in a wired and/or wireless manner).

Figure 12:
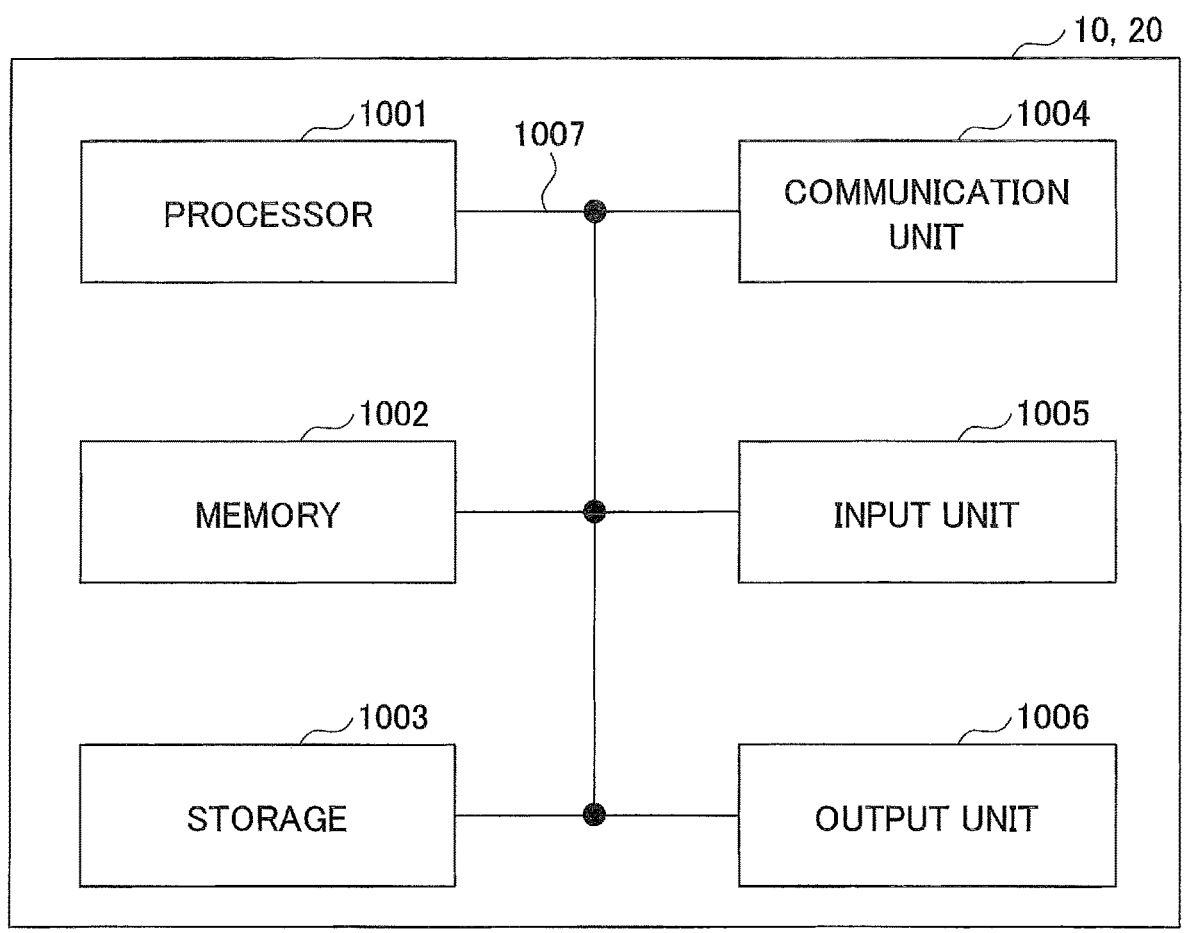
FIG. 12 is a diagram illustrating an example of a hardware configuration of the user equipment 10 and the base station 20.

Further, for example, both the user equipment 10 and the base station 20 in an embodiment of the present invention may function as computers that perform the processes according to the present embodiment. FIG. 12 is a diagram illustrating a hardware configuration example of the user equipment 10 and the base station 20 according to the present embodiment. The user equipment 10 and the base station 20 described above may be respectively physically configured as a computer device including a processor 1001, a memory 1002, a storage 1003, a communication unit 1004, an input unit 1005, an output unit 1006, a bus 1007, and the like.

It is noted that in the following description, a word "unit" may be referred to as a circuit, a device, a unit, or the like. The hardware configurations of the user equipment 10 and the base station 20 may be configured to include one or more of units indicated by 1001 to 1006 shown in the drawing, or may be configured not to include some units.

The functions of the user equipment 10 and the base station 20 are realized by causing hardware such as the processor 1001 and the memory 1002 to read predetermined software (a program) and causing the processor 1001 to perform computation and to control communication of the communication unit 1004 and reading and/or writing of data in the memory 1002 and the storage 1003.

The processor 1001 controls the computer as a whole, for example, by operating an operating system. The processor 1001 may be constituted by a central processing unit (CPU) including an interface with peripherals, a control unit, a calculation unit, a register, and the like.

Further, the processor 1001 reads a program (program codes), a software module, or data from the storage 1003 and/or the communication unit 1004 to the memory 1002 and performs various processes in accordance therewith. As the program, a program causing a computer to perform at least a part of the operations described in the above embodiment is used. For example, the transmission unit 110, the reception unit 120, the control unit 130 and the data storage unit 140 of the user equipment 10 shown in FIG. 10 may be embodied by a control program which is stored in the memory 1002 and operated by the processor 1001. Further, for example, the transmission unit 210, the reception unit 220, the control unit 230 and the data storage unit 240 of the base station 20 shown in FIG. 11 may be embodied by a control program which is stored in the memory 1002 and operated by the processor 1001. Various processes described above have been described to be performed by a single processor 1001, but may be simultaneously or sequentially performed by two or more processors 1001. The processor 1001 may be mounted as one or more chips. It is noted that the program may be transmitted from a network via an electric communication line.

The memory 1002 is a computer-readable recording medium and may be constituted, for example, by at least one of a read only memory (ROM), an erasable programmable ROM (EPROM), an electrically erasable programmable ROM (EEPROM), a random access memory (RAM), and the like. The memory 1002 may be referred to as a register, a cache, or a main memory (a main storage unit). The memory 1002 can store a program (program codes), a software module, or the like which can be used to perform the processes according to an embodiment of the present invention.

The storage 1003 is a computer-readable recording medium and may be constituted, for example, by at least one of an optical disc such as a compact disc ROM (CD-ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, a magnetic strip, and the like. The storage 1003 may be referred to as an auxiliary storage unit. The recording medium described above may be for example a database including the memory 1002 and/or the storage 1003, a server, and another appropriate medium.

The communication unit 1004 is hardware (a transceiver device) that allows communication between computers via a wired and/or wireless network and is referred to as, for example, a network device, a network controller, a network card, a communication module, or the like. For example, the transmission unit 110 and the reception unit 120 of the user equipment 10 may be embodied by the communication unit 1004. Further, the transmission unit 210 and the reception unit 220 of the base station 20 may be embodied by the communication unit 1004.

The input unit 1005 is an input device (such as a keyboard, a mouse, a microphone, a switch, a button, a sensor, etc.) that receives an input from the outside. The output unit 1006 is an output device (such as a display, a speaker, or an LED lamp etc.) that performs outputting to the outside. It is noted that the input unit 1005 and the output unit 1006 may be configured as a unified body (such as a touch panel).

In addition, the units such as the processor 1001 and the memory 1002 are connected to each other via the bus 1007 for communicating information. The bus 1007 may be constituted by a single bus or may be constituted by different buses between the units.

In addition, the user equipment 10 and the base station 20 may be respectively configured to include hardware such as a microprocessor, a digital signal processor (DSP), an application specific integrated circuit (ASIC), a programmable logic device (PLD), or a field programmable gate array (FPGA), and a part or all of the functional blocks may be embodied by the hardware. For example, the processor 1001 may be mounted as at least one of such hardware modules.

(Summary of Embodiment)

As described above, according to the present embodiment, there is provided a user equipment, the user equipment including: a reception unit that receives configuration information in which a reference signal and a synchronous signal block are associated with each other from a base station; a control unit that selects a specific reference signal from a plurality of reference signals to be monitored in a random access procedure; and a transmission unit that transmits a random access signal to the base station using a resource corresponding to the specific reference signal, wherein the reception unit assumes based on the configuration information that there is a quasi co-location relation between the synchronous signal block corresponding to the specific reference signal and a signal to be monitored in a predetermined search space, and monitors the signal.

According to the above configuration, in a radio communication system in which beam forming is performed, a technique is provided that enables a user equipment to properly monitor the signal.

Wherein the configuration information includes information of a reference signal associated with a synchronous signal block and information of a reference signal not associated with a synchronous signal block, and wherein in the random access procedure, the reception unit may monitor the reference signal associated with the synchronous signal block. With this configuration, a proper reference signal can be monitored in the random access procedure.

In the case where the signal to be monitored is a signal transmitted with a resource at a timing associated with a synchronous signal block, the reception unit may monitor the signal at the timing associated with the synchronous signal block corresponding to the specific reference signal. With this configuration, the signal can be monitored at proper timing.

In addition, according to the present embodiment, there is provided a user equipment, the user equipment including: a control unit that selects a specific reference signal from a plurality of reference signals to be monitored in a random access procedure; a transmission unit that transmits a random access signal to a base station using a resource corresponding to the specific reference signal; and a reception unit that assumes that a there is a quasi co-location relation between the specific reference signal and a signal to be monitored in a predetermined search space, and monitors the signal.

According to the above configuration, in a radio communication system in which beam forming is performed, a technique is provided that enables a user equipment to properly monitor the signal.

Further, according to the present embodiment, there is provided a user equipment, the user equipment including: a reception unit that receives control information which is a trigger for starting a random access procedure from a base station; and a transmission unit that transmits a random access signal to the base station based on the trigger, wherein the reception unit assumes that there is a quasi co-location relation between a specific synchronous signal block designated by the control information and a signal to be monitored in a predetermined search space, and monitors the signal.

According to the above configuration, in a radio communication system in which beam forming is performed, a technique is provided that enables a user equipment to properly monitor the signal.

(Supplement to the Embodiment)

While the embodiments of the present invention have been described above, the disclosed inventions are not limited to the embodiments, and it could be understood by those skilled in the art that various modifications, corrections, alternatives, replacements, and the like can be made thereto. While specific numerical examples have been used to facilitate understanding of the present invention, the numerical values are just an example and appropriate values may be used, unless otherwise specified. The classifications of the items in the above description are not essential to the present invention, and details described in two or more articles may be combined for use if necessary, or details of a certain article may be applied to details described in another article (unless incompatible). The boundaries of the functional units or the processing units in the functional block diagrams do not necessarily correspond to boundaries of physical components. The operations of two or more functional units may be performed by a single physical component, or the operation of a single functional unit may be performed by two or more physical components. With respect to the processing procedure described in the embodiment, the order of processing may be changed as long as there is no contradiction. For convenience of processing explanation, the user equipment 10 and the base station 20 have been described using the functional block diagrams, but such devices may be embodied in hardware, software, or a combination thereof. Software operating by the processor of the user equipment 10 according to the embodiment of the present invention and software operating by the processor of the base station 20 according to the embodiment of the present invention may be respectively stored in a random access memory (RAM), a flash memory, a read only memory (ROM), an EPROM, an EEPROM, a register, a hard disk (HDD), a removable disk, a CD-ROM, a database, a server, or any other appropriate storage medium.

In addition, notification of information is not limited to the aspect/embodiment described in the specification, but may be performed using another manner. For example, the notification of information may be performed using physical layer signaling (for example, downlink control information (DCI) or uplink control information (UCI)), upper layer signaling (for example, radio resource control (RRC) signaling, medium access control (MAC) signaling, or broadcast information (master information block (MIB) or system information block (SIB))), other signals, or combinations thereof. Further, the RRC signaling may be referred to as an RRC message and may be, for example, an RRC connection setup message, an RRC connection reconfiguration message, or the like.

The respective aspects/embodiments described in the specification may be applied to systems employing long term evolution (LTE), LTE-advanced (LTE-A), SUPER 3G, IMT-Advanced, 4th generation mobile communication system (4G), 5th generation mobile communication system (5G), future radio access (FRA), new Radio (NR), W-CDMA (registered trademark), GSM (registered trademark), CDMA2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), or other appropriate systems and/or at least one of next-generation systems to which these systems are extended. Further, a plurality of systems may be combined (for example, a combination of at least one of LTE and LTE-A, and 5G, etc.) and may be applied.

The processing procedures, the sequences, the flowcharts, and the like of the aspects/embodiments described in the specification may be changed in the order as long as they are not incompatible with each other. For example, in the method described in the specification, various steps are described in an exemplary order and are not limited to the described specific order.

Specific operations which are performed by the base station 20 in the specification may be performed by an upper node thereof in some cases. In a network including one or more network nodes having the base station 20, various operations which are performed to communicate with the user equipment 10 can clearly be performed by the base station 20 and/or another network nodes (for example, an MME or an S-GW can be considered but the network nodes are not limited thereto) other than the base station 20. A case in which the number of network nodes, other than the base station 20, is one has been described above; however, a combination of plural different network nodes (for example, the MME and the S-GW) may be used.

The respective aspects/embodiments described in the specification may be used alone, may be used in combination, or may be switched according to implementation thereof.

The user equipment 10 may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station 20 may be referred to as a NodeB (NB), an enhanced NodeB (eNB), a base station, gNB or some other appropriate terms by those skilled in the art.

As used in the specification, the terms "determining" and "deciding" may include various types of operations. For example, "determining" and "deciding" may include deeming that to perform judging, calculating, computing, processing, deriving, investigating, looking up or search or inquiry (for example, search in a table, a database, or another data structure), or ascertaining is to perform "determining" or "deciding." In addition, "determining" and "deciding" may include deeming that to perform receiving (for example, reception of information), transmitting (for example, transmission of information), input, output, or accessing (for example, accessing data in a memory) is to perform "determining" or "deciding." Further, "determining" and "deciding" may include deeming that to perform resolving, selecting, choosing, establishing, comparing, or the like is to perform "determining" or "deciding." Namely, "determining" and "deciding" may include deeming that some operations are to perform "determining" or "deciding." In addition, "determining" and "deciding" may be read as "assuming", "expecting", "considering", or the like.

As used in the specification, an expression "on the basis of" does not refer to "on the basis of only," unless otherwise specified. In other words, the expression "on the basis of" refers to both "on the basis of only" and "on the basis of at least."

So long as terms "include" and "including" and modifications thereof are used in the specification or the appended claims, these terms are intended to have a comprehensive meaning similar to a term "comprising." A term "or" which is used in the specification or the claims is intended not to mean an exclusive or.

In the entire disclosure, for example, when an article such as a, an, or the is added in translation into English, such an article may refer to including the plural unless otherwise recognized from the context.

Although the present invention is described above in detail, it is obvious to those skilled in the art that the present invention is not limited to the embodiments described in the specification. The present invention can be implemented as modifications and alterations without departing from the gist and scope of the present invention defined in claims set forth below. Accordingly, the description of the specification is intended to be exemplary and does not have any restrictive meaning to the present invention.

EXPLANATIONS OF LETTERS OR NUMERALS

10 User equipment
110 Transmission unit
120 Reception unit
130 Control unit
140 Data storage unit
20 Base station
210 Transmission unit
220 Reception unit
230 Control unit
240 Data storage unit
1001 Processor
1002 Memory
1003 Storage
1004 Communication unit
1005 Input unit
1006 Output unit

The invention claimed is:

1. A user equipment comprising:
a reception unit that receives configuration information in which a reference signal and a synchronous signal block are associated with each other from a base station;
a control unit that selects a specific reference signal from a plurality of reference signals to be monitored in a random access procedure; and
a transmission unit that transmits a random access signal to the base station using a resource corresponding to the specific reference signal,
wherein the reception unit assumes based on the configuration information that there is a quasi co-location relation between the synchronous signal block corresponding to the specific reference signal and a signal to be monitored in a predetermined search space, and monitors the signal.

2. The user equipment according to claim 1,
wherein the configuration information comprises information of a reference signal associated with a synchronous signal block and information of a reference signal not associated with a synchronous signal block,
wherein in the random access procedure, the reception unit monitors the reference signal associated with the synchronous signal block.

3. The user equipment according to claim 2,
wherein in the case where the signal to be monitored is a signal transmitted with a resource at a timing associated with a synchronous signal block, the reception unit monitors the signal at the timing associated with the synchronous signal block corresponding to the specific reference signal.

4. The user equipment according to claim 1,
wherein in the case where the signal to be monitored is a signal transmitted with a resource at a timing associated with a synchronous signal block, the reception unit monitors the signal at the timing associated with the synchronous signal block corresponding to the specific reference signal.

5. A signal monitoring method performed by a user equipment, the method comprising:
receiving configuration information in which a reference signal and a synchronous signal block are associated with each other from a base station;
selecting a specific reference signal from a plurality of reference signals to be monitored in a random access procedure;
transmitting a random access signal to the base station using a resource corresponding to the specific reference signal;
assuming based on the configuration information that there is a quasi co-location relation between the synchronous signal block corresponding to the specific reference signal and a signal to be monitored in a predetermined search space, and
monitoring the signal.

* * * * *